May 5, 1936. J. M. BOYKOW 2,039,878
APPARATUS FOR FINDING THE COURSE ALONG ANY DEFINITE GREAT CIRCLE
Filed Oct. 6, 1934
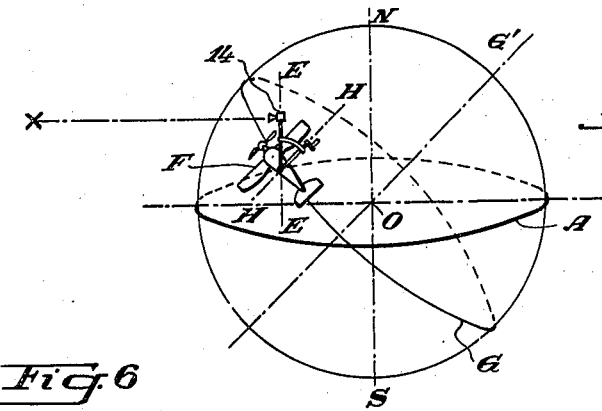
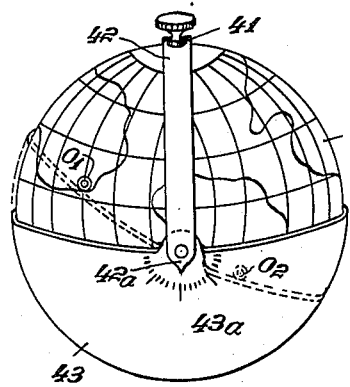
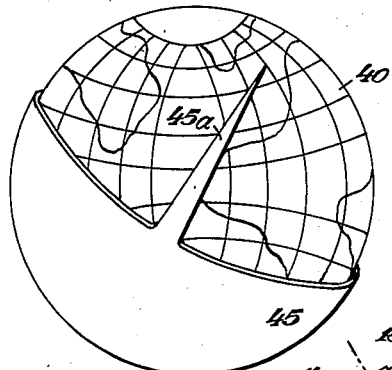
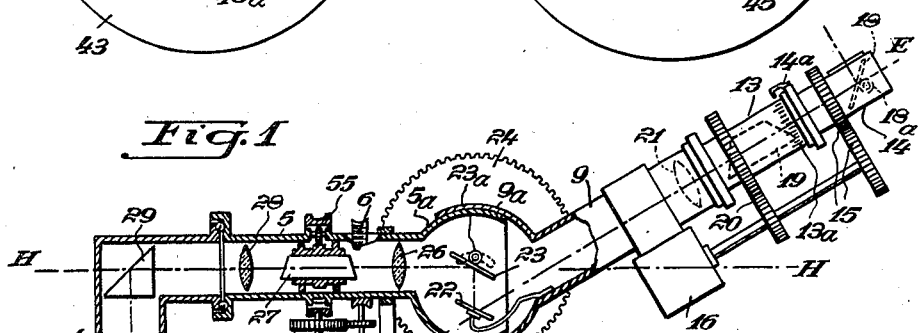
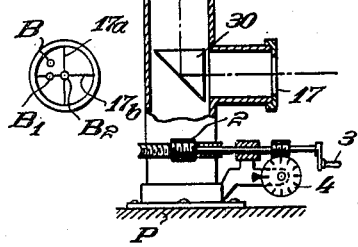
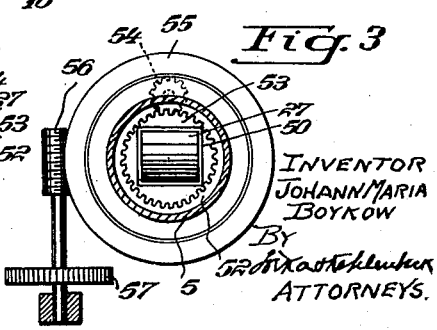
INVENTOR
JOHANN MARIA BOYKOW
BY
ATTORNEYS.

Patented May 5, 1936

2,039,878

UNITED STATES PATENT OFFICE 2,039,878

APPARATUS FOR FINDING THE COURSE ALONG ANY DEFINITE GREAT CIRCLE

Johann Maria Boykow, Berlin-Lichterfelde, Germany

Application October 6, 1934, Serial No. 747,156
In Germany October 7, 1933

12 Claims. (Cl. 88—2.3)

As is well-known, the shortest way between two points of the earth surface is represented by the great circle laid around the globe through these two points. A great circle will be obtained by intersecting the surface of the globe by any plane crossing the centre of the globe. The position of any plane being defined by three points and the plane of every great circle crossing the centre of the globe, any two different points on the earth's surface will define one definite great circle, the plane of such circle including a definite angle with the rotation axis of the earth.

If a craft is maintaining a definite course direction which does not coincide with a meridian or the equator, such craft will not move along a great circle but along a loxodromic line, cutting, as is well-known, the meridians at equal angles and, therefore, having the form of a spiral line terminating at the north pole or the south pole respectively. Hitherto, in order to obtain a course nearly along a definite great circle connecting the point of departure with the point of destination, the course is from time to time varied in such a way that the whole travel-line consists of loxodromic parts and thus approximates the desired great circle.

The object of this invention is to provide an apparatus by which the great circle connecting the point of departure with the point of destination may be actually found, so that a craft equipped with such an apparatus can continuously move along the desired great circle. For this reason the new apparatus may also be called a "great circle finder".

The main principle of the invention consists in utilizing the fact that the position of the polar axis of the travel path in relation to the terrestrial globe will be maintained constant as long as the craft is travelling along the predetermined great circle.

Other objects will appear hereinafter. It will be evident that many embodiments of the invention may be found. In the preferred form there are provided two elements or members, of which the one serves for reproducing the position of the rotation axis of the earth and the other for reproducing the position of the polar axis of the great circle travel path. As regards these elements and their cooperation there are many possibilities. A very exact and simple embodiment is obtained by controlling and supervising the positions of the two said elements by relating them to an astronomical fixed point, for instance the sun. As regards this embodiment the two elements or members reproducing the positions of the polar axis of the great circle and the position of the rotation axis of the globe are constituted by the rotation axes of a sight which, in using the apparatus, is to be maintained directed to said astronomical fixed point. To this end the sight is driven by a constant speed motor, for instance a spring motor, around that axis which is parallel to the axis of the globe with an angular velocity which is equal to the angular velocity of the earth.

In consequence of this, the sight having been properly adjusted will be maintained directed to the astronomical fixed point, unless the apparatus is moved in relation to the surface of the earth. When now the apparatus is travelling along a great circle the conditions, as regards the adjustment of the apparatus in relation to the astronomical fixed point, are equal to those that have been maintained when the apparatus is at rest in relation to the earth but the earth would additionally rotate about the polar axis of the great circle (apparent earth rotation). If now this apparent rotation of the earth is also compensated the sight will necessarily be maintained directed to the astronomical fixed point. The said apparent earth rotation is, as regards its value, equal to the speed of the craft equipped with the said apparatus. If this value is measured in any suitable way and if according to this value the sight is rotated about the axis parallel to the polar axis of the great circle travel path, the sight will be maintained directed to the astronomical fixed point as long as the craft is moving along the great circle. In case the image of the astronomical fixed point leaves the zero point of the cross wires of the focus plane belonging to the sight, this indicates that the craft has deviated from the great circle. Therefore, in order to move along the great circle the craft is to be steered in such a manner that the astronomical fixed point or, more exactly, the image of the astronomical fixed point will be maintained at the zero point of one of the cross wires.

For the purpose of a better explanation it has been assumed above that besides the turning of the sight according to the actual earth rotation, the sight is also continuously turned in such a manner as to compensate the apparent earth rotation. A continuous compensating of the apparent earth rotation and an exact measurement of the speed of the craft or any measurement of the speed at all is not required as will be seen from the following descriptive drawing.

For a more complete understanding of the invention reference should be had to the accompanying drawing.

Fig. 1 is an elevational and in part a sectional view of an apparatus embodying the invention.

Fig. 2 shows some elements of the embodiment illustrated in Fig. 1, but on an enlarged scale to make the detail features of these elements clear.

Fig. 3 is a vertical sectional view taken approximately in the plane of line III—III of Fig. 2.

Fig. 4 is an elevational detail view of the focus plane element of the embodiment illustrated in Fig. 1, in the field of which focus plane element some positions of the image of the astronomical fixed point being shown for the sake of better explanation.

Fig. 5 is a geometrical diagram showing the surface of the terrestrial globe and on this globe a great circle along which an aircraft equipped with an apparatus embodying this invention is travelling.

Fig. 6 is a perspective view of an auxiliary device serving for determining the angle between the polar axis of a definite great circle and the rotation axis of the earth.

Fig. 7 is a perspective view of a modified embodiment of the auxiliary device shown in Fig. 6.

Referring now to Fig. 1, P is a base or the platform which, in general, is to be stabilized in a horizontal plane in any manner, for instance, by means of a well-known gyroscope system. The apparatus embodying the invention is mounted on this base P. The said apparatus comprises a vertical tubing 1 angularly adjustable around a vertical axis by means of a worm gear 2 and a hand crank 3. The adjustment of the tubing 1 is indicated by the indicating device 4, coupled with the said handle 3. On the tubing 1 or, more exactly, on a horizontal lateral part of this tubing a tubing 5 is rotatably mounted, angularly adjustable around a horizontal axis H—H by means of a worm gear 6 and a handle 7 according to the readings on a scale 8, coupled with the said handle 7. A tubing 9 in turn is mounted pivotally, for instance as shown by means of hollow pivot members 5a, 9a of cylindrical curvature, on the said horizontal tubing 5 and the tubing 9 respectively. The adjustment of this tubing 9 in relation to the tubing 5 is achieved by means of a hand knob 10, the bearing of which is carried by a support 5b rigidly fixed to the tubing 5. On the axis of the said knob 10 a toothed wheel 11 is mounted, meshing with a toothed wheel segment 9b of the pivot part 9a. The adjusted angle, i. e. the angle between the tubing 9 or, more exactly, the geometric axis E—E of this tubing 9 and the tubing 5, or better, the geometric axis H—H of this tubing, is indicated by the pointer 10a fixed to the handknob 10 on the scale 12 which is provided on the support 5b. By means of a connecting tubing 13 rotatably mounted on the tubing 9, the latter carries a sight 14, rotatable in relation to the tubing 13.

The said sight 14 is rotatable around the geometrical longitudinal axis E—E of the tubing 9 by means of the spur gear system 15 coupled with a springmotor 16 fastened to the tubing 9. The field covered by the sight 14 is projected by means of the optical system mounted in the tubings 1, 5, 9 and 13 upon the image or focus plane 17, where there is a glass plate or the like with cross wires 17a and 17b (see Fig. 4).

The optical system shown in the drawing comprises a mirror 18 mounted in the sight 14, which mirror is to be adjusted around the axis 18a according to the declination of the astronomical fixed point. Furthermore for the purpose of reversing the image a Dove-prism 19 is provided in the connecting tubing 13. To meet its purpose, this Dove-prism must be turned around the geometrical axis E—E at half of that angular velocity at which the sight 14 is rotated. To effect this, the tubing 13 carrying the prism 19 is coupled with the springmotor 16 by means of the spur gear system 20. The transmission ratio of these two gears is such that the tubing 13 will rotate at half the angular velocity of the sight 14, so that, if the sight turns through an angle of 360°, the tubing 13 turns through an angle of 180°. Within the tubing 9 the objective 21 is mounted. In the image or focus plane of this objective 21 within the cavity formed by the pivot 5a, 9a there is a mirror 22 fastened to the pivot part 9a. From this mirror the rays are reflected to the mirror 23, which is mounted to turn about the axis of a pin 23a journaled in the pivot part 5a.

It will easily be understood that the mirror 23 must be turned at half of that angular velocity at which the tubing 9 and, at the same time, the mirror 22 are turned in relation to the tubing 5, thus enabling the reflected beam from the mirror 23 to maintain its direction parallel to the tubing 5. It is preferred to couple the mirror 23 with the hand knob 10 for an automatic adjustment of said mirror when the tubing 9 is turned about the pivot 5a, 9a. To this end a spur gear system 24, 25 is provided in the embodiment illustrated by the drawing, of which spur gear the toothed wheel 24 is secured to the pivot pin 23a of the mirror 23 and the toothed wheel 25 is fastened to the spindle of the hand knob 10. The transmission ratio of this spur gear is according to the above explanation such that the mirror 23 will turn at half of that angular velocity, at which the tubing 9 and the mirror 22 fastened to this tubing 9 are rotated when the hand knob 10 is turned. From the mirror 23 the path of the rays is through the objective 26, the Dove-prism 27, the objective 28, the two prisms 29 and 30 to the image or focus plane 17. For better illustration the path of rays is shown by a single line.

The Dove-prism 27 must follow the angular movement of the tubing 5 at half the angular velocity of this tubing. To this end, as will be evident from Figs. 2 and 3, the Dove-prism 27 is mounted on a frame or carrier 50 provided with two guiding rings 51 and 52 and a toothed ring 53 meshing with a toothed wheel 54 rotatably journaled on the tubing 5 at one side thereof. This toothed wheel 54 in turn meshes with internal teeth on a cylindrical ring 55 constituting, as regards its exterior, the wheel of a worm gear 56, the worm of which is coupled by means of its shaft and a spur gear system 57 with the shaft of the hand crank 7. The transmission ratio of the said gears is such that the Dove-prism 27, as said above, will follow the angular movement of the tubing 5 with half the angular velocity of this tubing.

In order to obtain a clearer illustration, in Fig. 1 the tubing 17 containing the focus plane is shown as being parallel to the tubing 5, but I desire it to be understood that I do not wish to restrict myself to this particular arrangement.

It will be clear to those skilled in the art that the optical system shown in the drawing may be replaced by any other suitable optical system. This remark applies particularly to the so-called optical pivot 23a, 22 within the cavity formed by the mechanical pivot 5a, 9a. The tubing 5 or, more exactly, its geometrical axis H—H represents that rotation axis of the sight 14 which is to be positioned according to the axis of the great circle travel path of the craft carrying this apparatus. The tubing 9 or, more exactly, its geometrical axis E—E represents that rotation axis of the sight 14 which is to be positioned according to the rotation axis of the terrestrial globe. Accordingly, the spring motor 16 serves for, so to speak, "turning back" the sight 14 according to the actual earth rotation. In consequence of the fact that the tubing 5 or, more exactly, its geometrical axis H—H represents that axis which is to be positioned according to the axis of the great circle travel path of the craft, the apparatus is to be adjusted on this craft in such a way that the axis H—H within the horizontal plane will be at right angles to the direction of the travel path of the craft. Therefore, in general, i. e. in case no side slip arises, the axis H—H will be at right angles to the longitudinal axis of the craft. At the beginning of the travel, the tubing 9 is to be adjusted in relation to the tubing 5 in such a manner that the angle between the two tubings 5 and 9 or, more exactly, the angle between the geometrical axes H—H and E—E of these tubings is equal to the angle between the rotation axis of the terrestrial globe and the polar axis of the great circle along which the craft is to be moved. This adjustment is then not to be changed any more during the travel of the craft along this particular great circle.

For a better explanation of the mode of operation, reference may be had to Fig. 5. In this figure the terrestrial sphere with its rotation axis N—S and its equator A is shown. G represents a great circle, along which the aircraft F diagrammatically shown may be supposed travelling. G' designates the polar axis of said great circle G. By the term polar axis I means a line passing through the centre of the great circle and perpendicular to the plane of said circle. In Fig. 5, as regards the embodiment shown in Fig. 1, only the sight 14 and the two geometrical axes E—E and H—H are diagrammatically shown. As mentioned above, at the beginning of the travel of the craft, the tubings 5 and 9 are, in respect to each other, adjusted in such a manner that the angle between the two axes E—E and H—H is equal to the angle between the rotation axis N—S of the earth and the polar axis G' of the great circle which is to be travelled by the craft.

It may now be assumed that the craft be brought into the proper position and that, therefore, the axis H—H be parallel to the polar axis G'. Furthermore, by turning the sight 14 about the axis H—H, the axis E—E may be brought into a position parallel to the axis N—S of the globe. If now, furthermore, the sight 14 has been angularly adjusted about the axis E—E according to the local or meridian time for which purpose a scale 13a may be provided on the axis E—E or, more exactly, on the tubing 13, and a co-operating pointer 14a on the sight 14, the image of the astronomical fixed point, for instance of the sun, will be visible in the centre of the cross-wires 17a and 17b of the focus plane 17 (see Fig. 4). If the craft F is travelling along the great circle G, the conditions regarding the variation in the position of the great circle finder due to the movement of the craft along the great circle are equal to those that would obtain if the craft were in the centre of the globe and would rotate about its transverse axis, parallel to the axis H—H. If, therefore, for better understanding of the operation, the craft F is imagined as shifted parallel to itself into the centre O of the globe, it will be easily seen that one complete rotation of the craft F about its transverse axis corresponds to a travel of the craft F along the great circle G around the globe and that during this rotation the axis E—E would describe the surface of a cone, the axis of which would be the axis G'. In order to maintain the axis E—E in its parallel position in relation to the rotation axis of the earth, it is necessary to turn back the sight 14 around the axis H—H in relation to the craft in accordance with the movement of the craft F. When, for instance, the craft moves one way along the whole great circle G around the globe, the sight 14 will perform a complete rotation in relation to the craft. It will be easily understood that in this way the axis E—E will be maintained parallel to the rotation axis N—S of the earth. If the follow-up movement of the sight 14 about the axis H—H should be interrupted for a certain length of time, the image of the astronomical fixed point in the focus plane 17 will leave the wire 17b. From this it results that, in order to obtain the proper "follow up" movement of the said member, the operator need only take care to have the image of the astronomical fixed point remain on the wire 17b.

Any deviation of the craft from the line of the great circle G which is to be travelled by the craft, results regarding the position of the apparatus in conditions equal to those as would be obtained in displacing again the craft to the centre O of the globe and turning it about its vertical axis out of the plane through the great circle G.

It will be easily realized that such a turning of the craft which may correspond to the assumed deviation from the great circle to be travelled, will necessarily result in a displacement of the image of the astronomical fixed point along the direction of or parallel to the wire 17b. Therefore it can be determined from the position of the image within the field of the cross wires 17a and 17b whether the craft moves on the great circle to be travelled and also whether the sight 14 has been properly followed up by rotation about the axis H—H. So if, for instance, at a certain point of time the image of the astronomical fixed point within the field of the cross-wires 17a and 17b is at the point B shown in Fig. 4, it will be evident from this position B that the sight 14 has not sufficiently turned about the axis H—H. So the operator will have to turn the sight 14 about the axis H—H until the image of the astronomical fixed point arrives at the position B₁. Thereupon the craft will have to be steered so that the image of the astronomical fixed point moves along the wire 17b and arrives at the intersecting point of the two wires 17a and 17b, i. e. the position B₂. In the same way the operator may proceed in or presently upon starting the craft. In case of an aircraft, for instance, on ascending of the craft, the operator will first turn the craft about its upright axis until the image of the astronomical point becomes visible within the field of the cross wires 17a and 17b. The subsequent steps will take place as described above.

From the foregoing description it will be evident that the angle through which the sight 14 is turned about the axis H—H—after the initial adjustment at the beginning of travel—for compensating the apparent earth rotation, i. e. the movement of the craft relative to the earth, affords an immediate measure for the length of the travel path covered. The new apparatus may therefore at the same time be used as a meter for measuring the length of the travel path. Furthermore from the angular velocity with which the axis H—H is to be turned for compensating the apparent earth rotation the over ground speed of the craft may be derived. Consequently the new apparatus may be also applied for determining the said speed over ground.

In the above the influence of side drift caused, for instance, by water or air currents has not yet been taken in consideration. This influence can also be compensated in a very simple manner. For this purpose an auxiliary device may be used, which permits to determine the angle between the polar axis of the great circle travel path and the craft's transverse axis. Devices of this kind are well known, as will be for instance seen from the German Patent No. 513,546. According to said angle the great circle finder will be turned by means of the hand crank 3 around its vertical axis. It will be easily understood that the craft will move along the great circle in spite of the side drift, if the new apparatus is properly operated and used in the manner described above. The angle needed for the adjustment of the apparatus according to the angle between the rotation axis of the earth and the polar axis of the desired great circle may be determined by a calculation from the geographical data of the point of departure and the data of the point of destination. In a more simple manner the said angle may be obtained by means of the auxiliary device illustrated in Fig. 6. This device comprises a globe 40 having meridian lines and latitude circles. A bow 42 is rotatably mounted about an axis 41 fastened to the globe, and on this bow 42 in turn a hemisphere 43 is rotatably mounted. The axis about which the hemisphere 43 is rotatable in relation to the bow 42 and the axis about which the bow is rotatable in relation to the globe 40 intersect at right angles in the centre of the globe 40.

In the position shown in Fig. 6 the upper edge of the hemisphere 43 coincides with the equator line of the globe 40. The hemisphere 43 bears a scale 43a, on which its inclination is indicated by the hand 42a. The mode of operation of this auxiliary device is as follows:

If, for instance, the great circle connecting the point $o_1$ with the point $o_2$ or, more exactly, the angle between its polar axis and the rotation axis of the earth is to be determined, the hemisphere 43 by turning in relation to the bow and, if necessary, by turning the bow 42 in relation to the globe, is brought into such a position that its edge will pass through the two points $o_1$ and $o_2$. Thereupon the angle to be determined can be read from the scale 43a. A second and essentially simpler and, as regards the reading, more exact embodiment of the auxiliary device is shown in Fig. 7. It consists merely of the globe 40 and the member 45 rotatable in relation to the globe 40, which member consists of a hemisphere and an indicator 45a forming a quarter arc of a circle. As this indicator folows the curvature of the globe 40, this globe is encased by the member 45. In using this device the hemisphere is rotated in relation to the globe 40 until its edge connects the point of departure with the point of destination. The position of the indicator point 45a within the scale constituted by the latitude-circles will then show the angle to be determined as between the polar axis of the great circle and the rotation axis of the earth.

The fact that in this embodiment shown in Fig. 7 the latitude circles on the globe serve as a scale for reading the angle to be determined has the advantage that the scale and, therefore, the exactness of reading will be very great. In both embodiments shown in Figs. 6 and 7 the hemisphere 43 or 45 may be reduced to a ring.

In the great circle finder shown in Fig. 1 the image or focus field 17 is mounted on the tubing 1 or, more exactly, on a tubing branched from it. Instead of this, the focus field might be provided on the tubing 5 or on a side tubing of the tubing 5.

The new apparatus may be applied especially for navigating aircrafts performing flights at extraordinary heights, for instance, up to the stratosphere. As in such high flights the aircraft will assume a very steady attitude, a special platform stabilized, for instance, by a gyroscope or the like, will in most cases be unnecessary. Instead of stabilizing the entire apparatus, it will be sufficient to stabilize merely the focus field 17 or, more exactly, the cross wires 17a and 17b.

The great practical value of the new apparatus becomes obvious upon considering the fact that, in general, in performing flights at comparatively great altitudes there is practically no visibility down to the earth and for this reason no possibility of finding one's way by observing points on the earth. The same remark holds for transmarine flights and, therefore, the new apparatus affords a remarkable progress for such flights. Finally the new apparatus may, of course, be used on aquatic or land crafts. As far as the latter are concerned, rides through bleak, uninhabited areas, for instance, deserts, are examples of conditions where the use of my invention will prove of special value.

As an astronomical fixed point, according to which the new apparatus is to be adjusted, in the above the sun was mentioned. Instead of the sun any other astronomical fixed point can be used. The fact that astronomical fixed points cannot be seen from the earth when the sky is overcast, is without significance in performing high altitude flights, since they take place above the clouds in a region where the celestial bodies are visible at all times.

The new apparatus may be used even when the sky is not visible. In this case, however, an auxiliary device is necessary which determines the position of that astronomical fixed point according to which the apparatus is adjusted. If, for example, the sun is used as the astronomical fixed point it will be possible to determine the position of the sun by means of a bolometer or the like responding to the invisible radiation of the sun penetrating the clouds. If this bolometer or other measuring instrument is positioned according to the position of the sun, i. e. if the said instrument shows the direction of the sun in relation to the craft, and if in turn according to this instrument the great circle finder is adjusted, it will be possible to use the great circle finder even when the sky is overcast.

I wish it to be understood that although in order to make clear the nature of my invention I have described certain specific examples thereof in considerable detail, nevertheless it will be evident that the novel principles involved can be embodied in a great variety of different forms.

I claim:

1. A great circle finding instrument, comprising a sight movable about a horizontal axis and also about an axis intersecting the first-mentioned axis, means for rotating said sight about the first-mentioned axis in accordance with the movement of the instrument relatively to the earth, means for rotating the sight about the second-mentioned axis in accordance with the rotation of the earth about its own axis, and means for moving said sight to alter the angle between said two axes and make it equal to the angle between the earth's axis and a line perpendicular to the plane of the great circle path to be traveled, at the center of such great circle.

2. An apparatus for finding a definite great circle travel path containing an optical sight adapted to be directed to an astronomical fixed point, a support rotatable about a vertical axis, a tubing at right angles to the said support and rotatably mounted on it to turn about a horizontal axis, a second tubing, mechanical means pivotally connecting the first-named tubing with the second tubing to permit the latter to turn relatively to the former about an axis transverse to both of said axes, the said optical sight being mounted on the second tubing and rotatable about the geometrical axis of this tubing, and an optical system located within the tubings and co-operating with the said optical sight, the said optical system comprising an optical pivot arranged within the mechanical means pivotally connecting the said second tubing with the first-named tubing.

3. A great circle finding instrument, comprising a base, a carrier rotatable relatively thereto about a vertical axis, a supporting member mounted on said carrier and rotatable relatively thereto about a horizontal axis, a holder supported by said member and mounted to turn relatively thereto about an axis transverse to both of said first-mentioned axes, a sight carried by said holder and rotatable relatively thereto about an axis transverse to the holder's axis of rotation and intersecting the said horizontal axis, means for rotating said sight about its axis of rotation in accordance with the rotation of the earth about its own axis, and separate means for rotating the carrier relatively to its base, the supporting member relatively to said carrier, and the holder relatively to said member.

4. A great circle finding instrument, comprising a carrier, a supporting member mounted on said carrier and rotatable relatively thereto about a horizontal axis, a holder supported by said member and mounted to turn relatively thereto about an axis transverse to the first-mentioned axis, a sight carried by said holder and rotatable relatively thereto about an axis transverse to the holder's axis of rotation and intersecting said horizontal axis, means for rotating said sight about its axis of rotation in accordance with the rotation of the earth about its own axis, and separate means for rotating the supporting member relatively to said carrier, and the holder relatively to said member.

5 An instrument according to claim 4, in which the carrier is provided with an optical observation device, and in which an optical system directs light from said sight to said observation device.

6. An instrument according to claim 4, in which the carrier is provided with an optical observation device, and in which an optical system composed of elements mounted on the carrier, the supporting member, and the holder, directs light from said sight to said observation device.

7. An instrument according to claim 4, in which the carrier, the supporting member, the holder, and the sight are constructed as tubes within which are located the elements of an optical system for directing light from said sight to an optical observation device on the carrier.

8. An instrument according to claim 4, in which the carrier, the supporting member, the holder, and the sight are constructed as tubes within which are located the elements of an optical system for directing light from said sight to an optical observation device on the carrier, said elements including a prism interposed between other of said elements, and means for rotating such prism at half the speed at which the adjacent element is rotated.

9. An instrument according to claim 4, in which the carrier, the supporting member, the holder, and the sight are constructed as tubes within which are located the elements of an optical system for directing light from said sight to an optical observation device on the carrier, said elements including two mirrors in mutually reflecting relation, one of said mirrors being secured rigidly to said holder, and the other pivoted to said supporting member, and an operative connection for automatically turning said last-mentioned mirror on its pivot at one-half the angular rate at which the holder swings relatively to said supporting member.

10. A great circle finding instrument, comprising a sight movable about a horizontal axis and also about an axis intersecting the first-mentioned axis, optical means adjustably mounted in said sight and adapted to be inclined relatively to said second-mentioned axis, means for rotating said sight about the first-mentioned axis in accordance with the movement of the instrument relatively to the earth, means for rotating the sight about the second-mentioned axis in accordance with the rotation of the earth about its own axis, and means for moving said sight to alter the angle between said two axes and make it equal to the angle between the earth's axis and a line perpendicular to the plane of the great circle path to be travelled, at the center of such great circle.

11. A great circle finding instrument, comprising a sight movable about a horizontal axis and also about an axis intersecting the first-mentioned axis, means for rotating said sight about the first-mentioned axis in accordance with the movement of the instrument relatively to the earth, means for rotating the sight about the second-mentioned axis in accordance with the rotation of the earth about its own axis, said last-mentioned means including automatic operating means connected with said sight and operating at a constant speed such that said sight will make one complete rotation about said second-mentioned axis in twenty-four hours in a direction opposite to that of the earth's rotation, and means for moving said sight to alter the angle between said two axes and make it equal to the angle between the earth's axis and a line perpendicular to the plane of the great circle path to be travelled, at the center of such great circle.

12. A great circle finding instrument, comprising a sight movable about a horizontal axis and also about an axis intersecting the first-mentioned axis, optical means adjustably mounted in said sight and adapted to be inclined relatively to said second-mentioned axis, means for rotating said sight about the first-mentioned axis in accordance with the movement of the instrument relatively to the earth, means for rotating the sight about the second-mentioned axis in accordance with the rotation of the earth about its own axis, said last-mentioned means including automatic operating means connected with said sight and operating at a constant speed such that said sight will make one complete rotation about said second-mentioned axis in twenty-four hours in a direction opposite to that of the earth's rotation, and means for moving said sight to alter the angle between said two axes and make it equal to the angle between the earth's axis and a line perpendicular to the plane of the great circle path to be travelled, at the center of such great circle.

JOHANN MARIA BOYKOW.